United States Patent
Nguyen et al.

(10) Patent No.: US 12,501,434 B2
(45) Date of Patent: Dec. 16, 2025

(54) SIGNALING OF A SET OF RESOURCES TO SUPPORT INTER USER EQUIPMENT COORDINATION

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US); Shuanshuan Wu, San Diego, CA (US); Gene Wesley Marsh, San Diego, CA (US); Shailesh Patil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 770 days.

(21) Appl. No.: 17/690,736

(22) Filed: Mar. 9, 2022

(65) Prior Publication Data

US 2023/0292317 A1 Sep. 14, 2023

(51) Int. Cl.
*H04W 72/20* (2023.01)
*H04W 72/0446* (2023.01)

(52) U.S. Cl.
CPC ....... *H04W 72/20* (2023.01); *H04W 72/0446* (2013.01)

(58) Field of Classification Search
CPC .......................... H04W 72/20; H04W 72/0446
See application file for complete search history.

(56) References Cited

U.S. PATENT DOCUMENTS

| | | | |
|---|---|---|---|
| 12,010,687 B2 | 6/2024 | Elshafie et al. | |
| 12,047,979 B2 | 7/2024 | Wu et al. | |
| 2004/0264497 A1* | 12/2004 | Wang | H04W 74/002 370/465 |
| 2015/0016431 A1* | 1/2015 | Ranta-Aho | H04W 72/20 370/336 |
| 2018/0098308 A1* | 4/2018 | Sun | H04W 74/00 |
| 2021/0337519 A1* | 10/2021 | Farag | H04L 5/0078 |
| 2021/0378002 A1* | 12/2021 | Raghu | H04W 72/23 |
| 2022/0070906 A1* | 3/2022 | Wang | H04L 1/1893 |
| 2023/0094330 A1* | 3/2023 | Chen | H04W 72/02 370/329 |
| 2023/0422216 A1* | 12/2023 | Hong | H04W 72/25 |

(Continued)

*Primary Examiner* — Jasper Kwoh
(74) *Attorney, Agent, or Firm* — Holland & Hart LLP

(57) ABSTRACT

Methods, systems, and devices for wireless communications are described. A user equipment (UE) may transmit compressed bitmap(s) to indicate preferred or non-preferred sidelink resources. A first UE may monitor a set of sidelink resources including a set of slots and subchannels for the slots and determine which resources are available for communications for a second UE. In some examples, the first UE may generate a bitmap indicating which slots have at least one subchannel that is unavailable, and, for each slot having at least one subchannel that is unavailable, a bitmap indicating which subchannels are unavailable for that slot. The first UE may transmit the bitmaps to the second UE. In some examples, the first UE may generate a bitmap indicating which slots have at least one subchannel that is available, and, for each slot having at least one subchannel that is available, a bitmap indicating which subchannels are available.

27 Claims, 12 Drawing Sheets

(56) References Cited

U.S. PATENT DOCUMENTS

| | | | |
|---|---|---|---|
| 2024/0023073 A1* | 1/2024 | Zhao | .................. H04W 72/044 |
| 2024/0260060 A1 | 8/2024 | Wu et al. | |
| 2024/0381320 A1 | 11/2024 | Wu et al. | |

* cited by examiner

SIGNALING OF A SET OF RESOURCES TO SUPPORT INTER USER EQUIPMENT COORDINATION

FIELD OF TECHNOLOGY

The following relates to wireless communications, including signaling of a set of resources to support inter user equipment coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support signaling of a set of resources to support inter user equipment (UE) coordination. Generally, the described techniques provide for transmission of compressed bitmap(s) to indicate preferred (e.g., available) or non-preferred (e.g., unavailable) sidelink communications resources. A first UE may monitor a set of sidelink resources including a set of slots and associated subchannels for the slots. The first UE may determine which resources are available for communications for a second UE (e.g., for sidelink communication between the second UE and the first UE or for communications between the second UE and one or more third UEs). In some examples, the first UE may generate a bitmap indicating which slots have at least one subchannel that is unavailable. The first UE may also generate, for each slot having at least one subchannel that is unavailable, a bitmap indicating which subchannels are unavailable for that slot. The first UE may transmit the bitmaps to the second UE. Accordingly, the second UE may be aware of which slots and subchannels are unavailable and available when scheduling communications. In some examples, the first UE may generate a bitmap indicating which slots have at least one subchannel that is available. The UE may also generate, for each slot having at least one subchannel that is available, a bitmap indicating which subchannels are available.

A method for wireless communications at a first user equipment (UE) is described. The method may include monitoring a set of sidelink resources including a set of slots and respective subchannels associated with each slot of the set of slots, generating, based on the monitoring, an indication of a subset of slots of the set of slots, generating, a set of bitmaps, each bitmap of the set of bitmaps associated with a slot of the subset of slots and indicating an availability of at least one subchannel associated with the respective slot, and transmitting, to a second UE, a sidelink coordination message including the indication and the set of bitmaps.

An apparatus for wireless communications at a first UE is described. The apparatus may include a processor, memory coupled with the processor, and instructions stored in the memory. The instructions may be executable by the processor to cause the apparatus to monitor a set of sidelink resources including a set of slots and respective subchannels associated with each slot of the set of slots, generate, based on the monitoring, an indication of a subset of slots of the set of slots, generate, a set of bitmaps, each bitmap of the set of bitmaps associated with a slot of the subset of slots and indicating an availability of at least one subchannel associated with the respective slot, and transmit, to a second UE, a sidelink coordination message including the indication and the set of bitmaps.

Another apparatus for wireless communications at a first UE is described. The apparatus may include means for monitoring a set of sidelink resources including a set of slots and respective subchannels associated with each slot of the set of slots, means for generating, based on the monitoring, an indication of a subset of slots of the set of slots, means for generating, a set of bitmaps, each bitmap of the set of bitmaps associated with a slot of the subset of slots and indicating an availability of at least one subchannel associated with the respective slot, and means for transmitting, to a second UE, a sidelink coordination message including the indication and the set of bitmaps.

A non-transitory computer-readable medium storing code for wireless communications at a first UE is described. The code may include instructions executable by a processor to monitor a set of sidelink resources including a set of slots and respective subchannels associated with each slot of the set of slots, generate, based on the monitoring, an indication of a subset of slots of the set of slots, generate, a set of bitmaps, each bitmap of the set of bitmaps associated with a slot of the subset of slots and indicating an availability of at least one subchannel associated with the respective slot, and transmit, to a second UE, a sidelink coordination message including the indication and the set of bitmaps.

Some examples of the method, apparatuses, and non-transitory computer-readable medium described herein may further include operations, features, means, or instructions for receiving control signaling indicating a threshold reference signal received power and measuring a reference signal received power associated with each respective subchannel associated with each slot of the set of slots, where the availability of each respective subchannel associated with each slot of the set of slots may be based on comparing the measured reference signal received power associated with each respective subchannel associated with each slot of the set of slots to the threshold reference signal received power.

Some examples of the method, apparatuses, and non-transitory computer-readable medium described herein may further include operations, features, means, or instructions for generating the indication and the set of bitmaps based on the availability of each respective subchannel associated with each slot of the set of slots.

In some examples of the method, apparatuses, and non-transitory computer-readable medium described herein, receiving the control signaling may include operations, features, means, or instructions for receiving the control signaling from the second UE via a sidelink control information message.

In some examples of the method, apparatuses, and non-transitory computer-readable medium described herein, generating the indication may include operations, features, means, or instructions for generating one of a bitmap indicating the subset of slots or a set of slot indices indicating the subset of slots.

In some examples of the method, apparatuses, and non-transitory computer-readable medium described herein, generating the indication may include operations, features, means, or instructions for selecting the subset of slots based on each slot of the subset of slots being associated with at least one subchannel that may be unavailable for sidelink communications for the second UE.

In some examples of the method, apparatuses, and non-transitory computer-readable medium described herein, each bitmap of the set of bitmaps indicates an availability or an unavailability of a respective set of subchannels for the respective slot for sidelink communications for the second UE.

In some examples of the method, apparatuses, and non-transitory computer-readable medium described herein, generating the indication may include operations, features, means, or instructions for selecting the subset of slots based on each slot of the subset of slots being associated with at least one subchannel that may be available for sidelink communications for the second UE.

In some examples of the method, apparatuses, and non-transitory computer-readable medium described herein, each bitmap of the set of bitmaps indicates an availability or an unavailability of a respective set of subchannels for the respective slot for sidelink communications for the second UE.

In some examples of the method, apparatuses, and non-transitory computer-readable medium described herein, each bitmap of the set of bitmaps indicates an availability of a set of single slot resource associated with the respective slot.

Some examples of the method, apparatuses, and non-transitory computer-readable medium described herein may further include operations, features, means, or instructions for receiving a sidelink message via one of the set of sidelink resources based on the sidelink coordination message.

Some examples of the method, apparatuses, and non-transitory computer-readable medium described herein may further include operations, features, means, or instructions for transmitting the sidelink coordination message in one of a sidelink control stage 1 message, a sidelink control stage 2 message, a medium access control (MAC) control element, or a radio resource control message.

A method for wireless communications at a second UE is described. The method may include receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot and transmitting, to the first UE or one or more third UEs, one or more sidelink messages using one or more of the set of sidelink resources based on the sidelink coordination message.

An apparatus for wireless communications at a second UE is described. The apparatus may include a processor, memory coupled with the processor, and instructions stored in the memory. The instructions may be executable by the processor to cause the apparatus to receive, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot and transmit, to the first UE or one or more third UEs, one or more sidelink messages using one or more of the set of sidelink resources based on the sidelink coordination message.

Another apparatus for wireless communications at a second UE is described. The apparatus may include means for receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot and means for transmitting, to the first UE or one or more third UEs, one or more sidelink messages using one or more of the set of sidelink resources based on the sidelink coordination message.

A non-transitory computer-readable medium storing code for wireless communications at a second UE is described. The code may include instructions executable by a processor to receive, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot and transmit, to the first UE or one or more third UEs, one or more sidelink messages using one or more of the set of sidelink resources based on the sidelink coordination message.

Some examples of the method, apparatuses, and non-transitory computer-readable medium described herein may further include operations, features, means, or instructions for transmitting, to the first UE, control signaling indicating a threshold reference signal received power, where the availability of the at least one subchannel associated with the respective slots may be based on the threshold reference signal received power.

In some examples of the method, apparatuses, and non-transitory computer-readable medium described herein, transmitting the control signaling may include operations, features, means, or instructions for transmitting the control signaling via a sidelink control information message.

In some examples of the method, apparatuses, and non-transitory computer-readable medium described herein, the indication includes one of a bitmap indicating the subset of slots or a set of slot indices indicating the subset of slots.

In some examples of the method, apparatuses, and non-transitory computer-readable medium described herein, each bitmap of the set of bitmaps indicates an availability or an unavailability of a respective set of subchannels for the respective slot for sidelink communications for the second UE.

In some examples of the method, apparatuses, and non-transitory computer-readable medium described herein, each bitmap of the set of bitmaps indicates an availability of a set of single slot resources associated with the respective slot.

Some examples of the method, apparatuses, and non-transitory computer-readable medium described herein may further include operations, features, means, or instructions for receiving the sidelink coordination message in one of a sidelink control stage 1 message, a sidelink control stage 2 message, a MAC control element, or a radio resource control message.

DETAILED DESCRIPTION

Figure 1:
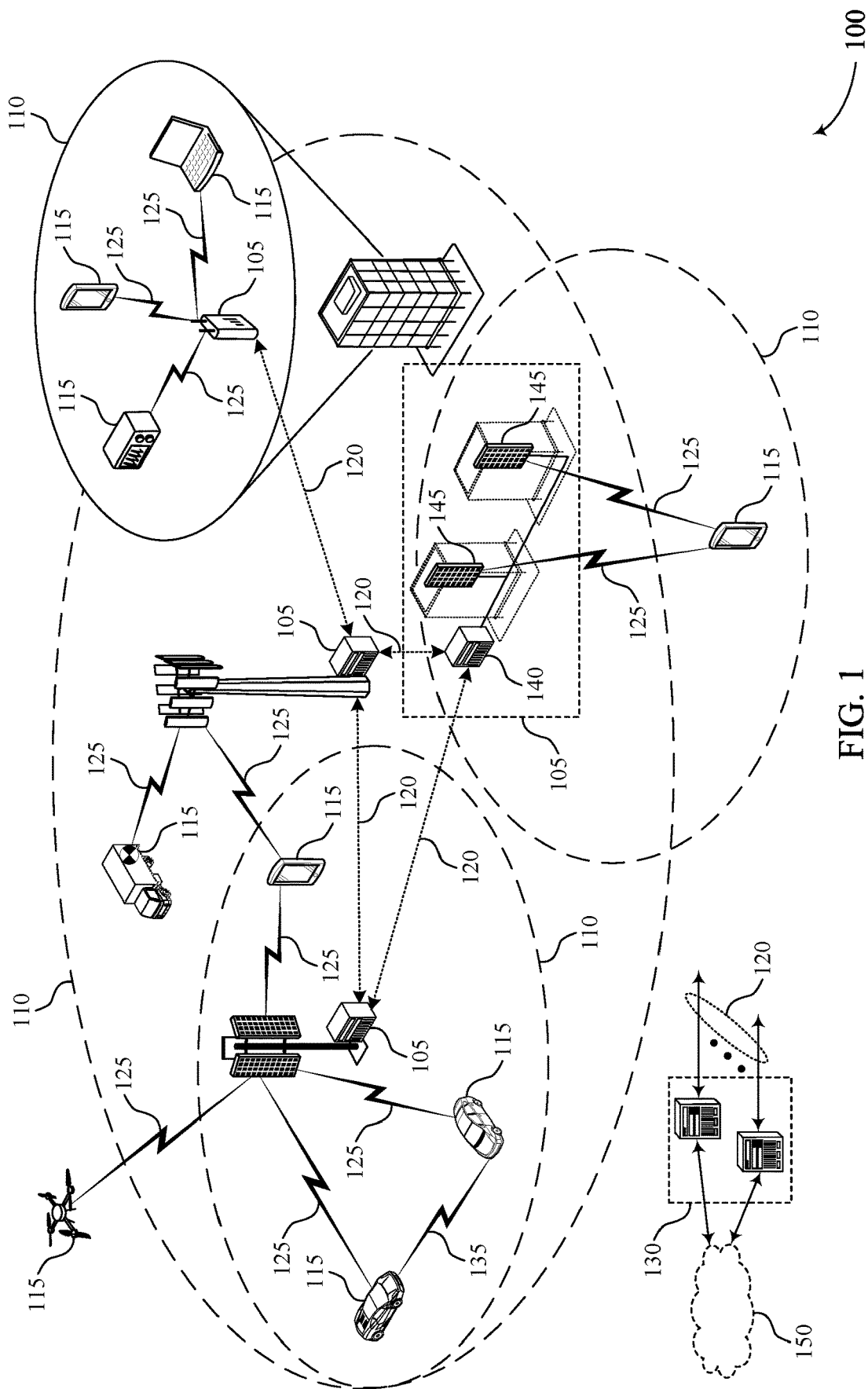
FIG. 1 illustrates an example of a wireless communications system that supports signaling of a set of resources to support inter user equipment (UE) coordination in accordance with aspects of the present disclosure.

Some wireless communications systems may support sidelinks for communications between communication devices. Sidelinks may refer to any communication link between similar communication devices such as user equipments (UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

UEs using sidelink communications may operate in a mode (e.g., mode 2) in which the UEs work together to coordinate resources for sidelink communication. UEs operating in mode 2 may monitor for and sense sidelink resources to determine which resources to use or avoid for those sidelink communications. The UEs may exchange UE coordination messages (which may also be referred to as reservation messages) indicating resources based on the sensing result. For instance, in type A inter-UE coordination, a first UE may send an indication to a second UE of a set of resources for the second UE to use (e.g., a grant) based on the sensing results. In type B inter-UE coordination, a first UE may send a set of resources to a second UE that are not preferred (e.g., are to be avoided) for the second UE based on the sensing results, potential or scheduled conflicts, or the like. In some examples, the sensing UE may transmit a bitmap indicating the preferred and non-preferred sidelink resources (e.g., slots and subchannels). Such a bitmap, however, may be large (e.g., 1000 bits for a 100 slot window). Accordingly, use of a bitmap to indicate preferred and non-preferred sidelink resources may result in a large overhead of signaling resources and processing.

The present disclosure relates to transmission of compressed bitmap(s) to indicate preferred (e.g., available) or non-preferred (e.g., unavailable) sidelink communications resources. A first UE may monitor a set of sidelink resources including a set of slots and associated subchannels for the slots. The first UE may determine which resources are available for communications for a second UE (e.g., for sidelink communication between the second UE and the first UE or for communications between the second UE and one or more third UEs). In some examples, the first UE may generate a bitmap indicating which slots have at least one subchannel that is unavailable. The first UE may also generate, for each slot having at least one subchannel that is unavailable, a bitmap indicating which subchannels are unavailable for that slot. The first UE may transmit the bitmaps to the second UE. Accordingly, the second UE may be aware of which slots and subchannels are unavailable and available when scheduling communications. In some examples, the first UE may generate a bitmap indicating which slots have at least one subchannel that is available. The UE may also generate, for each slot having at least one subchannel that is available, a bitmap indicating which subchannels are available.

Aspects of the disclosure are initially described in the context of wireless communications systems. Aspects of the disclosure are further illustrated by and described with reference to resource diagrams and process flows. Aspects of the disclosure are further illustrated by and described with reference to apparatus diagrams, system diagrams, and flowcharts that relate to signaling of a set of resources to support inter UE coordination.

FIG. 1 illustrates an example of a wireless communications system 100 that supports signaling of a set of resources to support inter UE coordination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

Thus, as described herein, a base station 105 may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 using sidelink communications may operate in mode 2, where the UEs work together to coordinate resources for sidelink communication. UEs 115 operating in mode 2 may monitor for and sense sidelink resources to determine which resources to use or avoid for those sidelink communications. The UEs 115 may exchange UE coordination messages (which may also be referred to as reservation messages) indicating resources based on the sensing result. For instance, in type A inter-UE coordination, a first UE 115 may send an indication to a second UE 115 of a set of resources for the second UE 115 to use (e.g., a grant) based on the sensing results. For example, the first UE 115 may identify resources having a reference signal received power (RSRP) greater than a configured threshold as unavailable. In some examples, the first UE 115 may receive an indication of the RSRP threshold from the second UE 115, for example via sidelink control information (SCI). In some examples, the first UE 115 may not expect to receive a sidelink transmission in a resource identified as unavailable (e.g., due to half duplex operation). In some examples, if the first UE 115 is a target of a sidelink transmission, the first UE 115 may identify resources having a reference signal received power (RSRP) less than a configured threshold as available, and indicate the available resources to the transmitting UE 115.

In type B inter-UE coordination, a first UE 115 may send a set of resources to a second UE 115 that are not preferred (e.g., are to be avoided) for the second UE 115 based on the sensing results, potential or scheduled conflicts, or the like. In some examples, the first UE may transmit a number N combinations of time resource indicator values (TRIVs) and frequency resource indicator values (FRIVs) to indicate the available or unavailable sidelink resources. In some examples, the first resource location of each TRIV may be separately indicated by the inter-UE coordination information.

In some examples, the sensing UE 115 may transmit a bitmap indicating the preferred and non-preferred sidelink resources (e.g., slots and subchannels). Such a bitmap, however, may be large (e.g., 1000 bits for a 100 slot window). If the sidelink signals are periodic, the bitmap size may further increase (e.g., by 4 times). Accordingly, use of a bitmap to indicate preferred and non-preferred sidelink resources may result in large resource overhead.

In many cases, the bitmap indicating the available resources may be sparse (e.g., most resources may be available). Accordingly, the first UE 115 may transmit compressed bitmap(s) to indicate preferred (e.g., available) or non-preferred (e.g., unavailable) sidelink communications resources to save signaling overhead (as compared to an uncompressed bitmap). A first UE 115 may monitor a set of sidelink resources including a set of slots and associated subchannels for the slots. The first UE 115 may determine which resources are available for communications for a second UE 115 (e.g., for sidelink communication between the second UE 115 and the first UE 115 or for communications between the second UE 115 and one or more third UEs 115). In some examples, the first UE 115 may generate a bitmap indicating which slots have at least one subchannel that is unavailable. The first UE may also generate, for each slot having at least one subchannel that is unavailable, a bitmap indicating which subchannels are unavailable for that slot. The first UE 115 may transmit the bitmaps to the second UE 115. Accordingly, the second UE 115 may be aware of which slots and subchannels are unavailable and available. when scheduling communications. In some examples, the first UE 115 may generate a bitmap indicating which slots have at least one subchannel that is available. The UE 115 may also generate, for each slot having at least one subchannel that is available, a bitmap indicating which subchannels are available.

Figure 2:
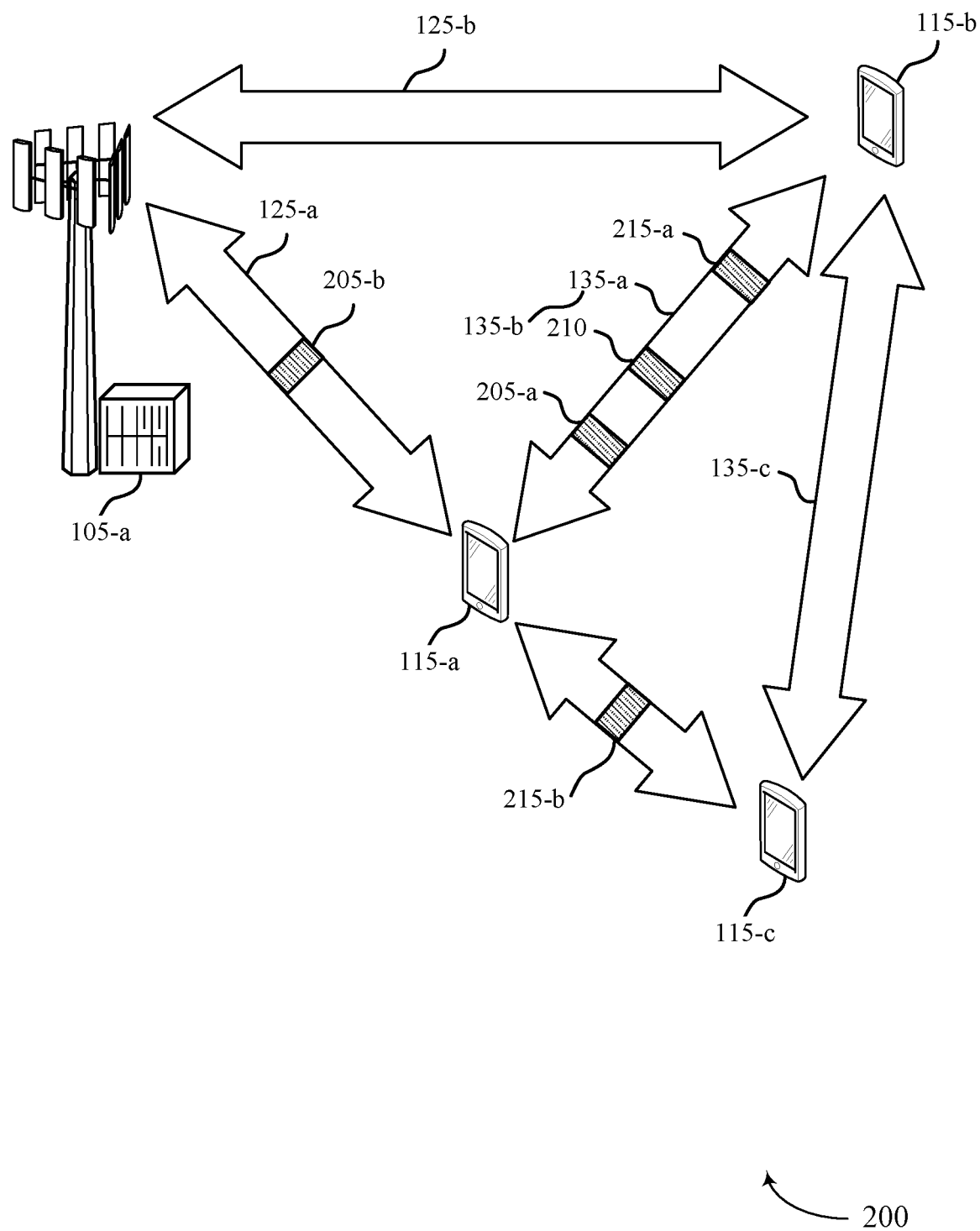
FIG. 2 illustrates an example of a wireless communications system that supports signaling of a set of resources to support inter UE coordination in accordance with aspects of the present disclosure.

FIG. 2 illustrates an example of a wireless communications system 200 that supports signaling of a set of resources to support inter UE coordination in accordance with aspects of the present disclosure. The wireless communications system 200 may include a UE 115-a, a UE 115-b, and a UE 115-c, which may be examples of a UE 115 as described herein. The wireless communications system 200 may include a base station 105-a, which may be an example of a base station 105 as described herein.

The UE 115-a may communicate with the base station 105-a using a communication link 125-a, which may be an example of an NR or LTE link between the UE 115-a and the base station 105-a. The UE 115-b may communicate with the base station 105-a using a communication link 125-b, which may be an example of an NR or LTE link between the UE 115-b and the base station 105-a. The communication link 125-a and the communication link 125-b may include bi-directional links that enable both uplink and downlink communication. For example, the UE 115-a may transmit uplink signals, such as uplink control signals or uplink data signals, to the base station 105-a using the communication link 125-a and the base station 105-a may transmit downlink transmissions, such as downlink control signals or downlink data signals, to the UE 115-a using the communication link 125-a. The UE 115-b may transmit uplink signals, such as uplink control signals or uplink data signals, to the base station 105-a using the communication link 125-b and the base station 105-a may transmit downlink transmissions, such as downlink control signals or downlink data signals, to the UE 115-b using the communication link 125-b.

The UE 115-a may communicate with the UE 115-b using a sidelink communication link 135-a. The UE 115-a may communicate with the UE 115-c using a sidelink communication link 135-b. The UE 115-b may communicate with the UE 115-c using a sidelink communication link 135-c. The sidelink communication link 135-a, the sidelink communication link 135-b, and the sidelink communication link 135-c may include bi-directional links that enable the UEs 115 to transmit and receive sidelink signals. In some examples, the base station 105-a may configure resources for the sidelink communication link 135-a, the sidelink communication link 135-b, or the sidelink communication link 135-c. In some examples, the UEs 115 may communicate over the sidelink communication links 135 using directional communications techniques (e.g., beamforming techniques). In some examples, the UE 115-a, the UE 115-b, and/or the UE 115-c may determine and configure the resources for the sidelink communication links 135 autonomously (e.g., without involvement from the base station 105-a).

The UE 115-a may monitor a set of sidelink resources including a set of slots and respective subchannels associated with each slot of the set of slots. In some examples, the UE 115-a may determine which sidelink resources are reserved for sidelink communications between other UEs 115 on sidelink communications links 135. In some examples, the UE 115-a may receive control signaling 205 indicating a threshold RSRP. In some examples, the UE 115-a may receive the control signaling 205-a from the UE 115-b, for example via an SCI message. In some examples, the UE 115-a may receive the control signaling 205-b from the base station 105-a. In some examples, the monitoring may include measuring an RSRP associated with each respective subchannel associated with each slot of the set of slots, where an availability of each respective subchannel associated with each slot of the set of slots is based on comparing the measured RSRP associated with each respective subchannel associated with each slot of the set of slots to the threshold RSRP. If the RSRP is greater than the threshold, the UE 115-a may determine that the respective resource is not available, and if the RSRP is not greater than the threshold, the UE 115-a may determine that the respective resource is available.

The UE 115-a may generate, based on the monitoring, an indication of a subset of slots of the set of slots. In some examples, the indication may be a first bitmap indicating the subset of slots. In some examples, the indication may be a set of slot indices. In some examples, the UE 115-a may select to use a bitmap or the set of slot indices based on whether the bitmap or set of slot indices is smaller in size. In some examples, the UE 115-a may generate the indication based on the availability of each respective subchannel associated with each slot of the set of slots. In some examples, the UE 115-a may select the subset of slots based on each slot of the subset of slots being associated with at least one subchannel that is unavailable for sidelink communications for the UE 115-b. In some examples, the UE 115-a may select the subset of slots based on each slot of the subset of slots being associated with a subchannel that is available for sidelink communications for the UE 115-b.

The UE 115-a may generate a set of bitmaps, each bitmap of the set of bitmaps associated with a slot of the subset of slots and indicating an availability of at least one subchannel associated with the respective slot. In some examples, where the UE 115-a may select the subset of slots based on each slot of the subset of slots being associated with at least one subchannel that is unavailable for sidelink communications for the UE 115-b, each bitmap of the set of bitmaps may indicate an availability or an unavailability of a respective set of subchannels for the respective slot for sidelink communications for the UE 115-b. In some examples, when all subchannels for a slot are unavailable, the UE 115-a may not generate a bitmap for that slot. In some examples, where the UE 115-a may select the subset of slots based on each slot of the subset of slots being associated with a subchannel that is available for sidelink communications for the UE 115-b, each bitmap of the set of bitmaps may indicate a respective set of subchannels for the respective slot that are available for sidelink communications for the UE 115-b. In some examples, where the UE 115-a may select the subset of slots based on each slot of the subset of slots being associated with a subchannel that is available for sidelink communications for the UE 115-b, each bitmap of the set of bitmaps may indicate a respective set of subchannels for the respective slot that are unavailable for sidelink communications for the UE 115-b. In some examples, when all subchannels for a slot are available, the UE 115-a may not generate a bitmap for that slot.

The UE 115-a may transmit, to the UE 115-b, a sidelink coordination message 210 including the indication and the set bitmaps. In some examples, the sidelink control message 210 may indicate (e.g., via a bit) whether the first indication is a bitmap or a set of slot indices. In some examples, the UE 115-a may transmit the sidelink coordination message 210 in an SCI message.

The UE 115-b may transmit, to the UE 115-a or to a third UE 115-c, one or more sidelink messages (e.g., sidelink message 215-a or sidelink message 215-b) using one or more of the set of sidelink resources based on the sidelink coordination message 210.

Figure 3:
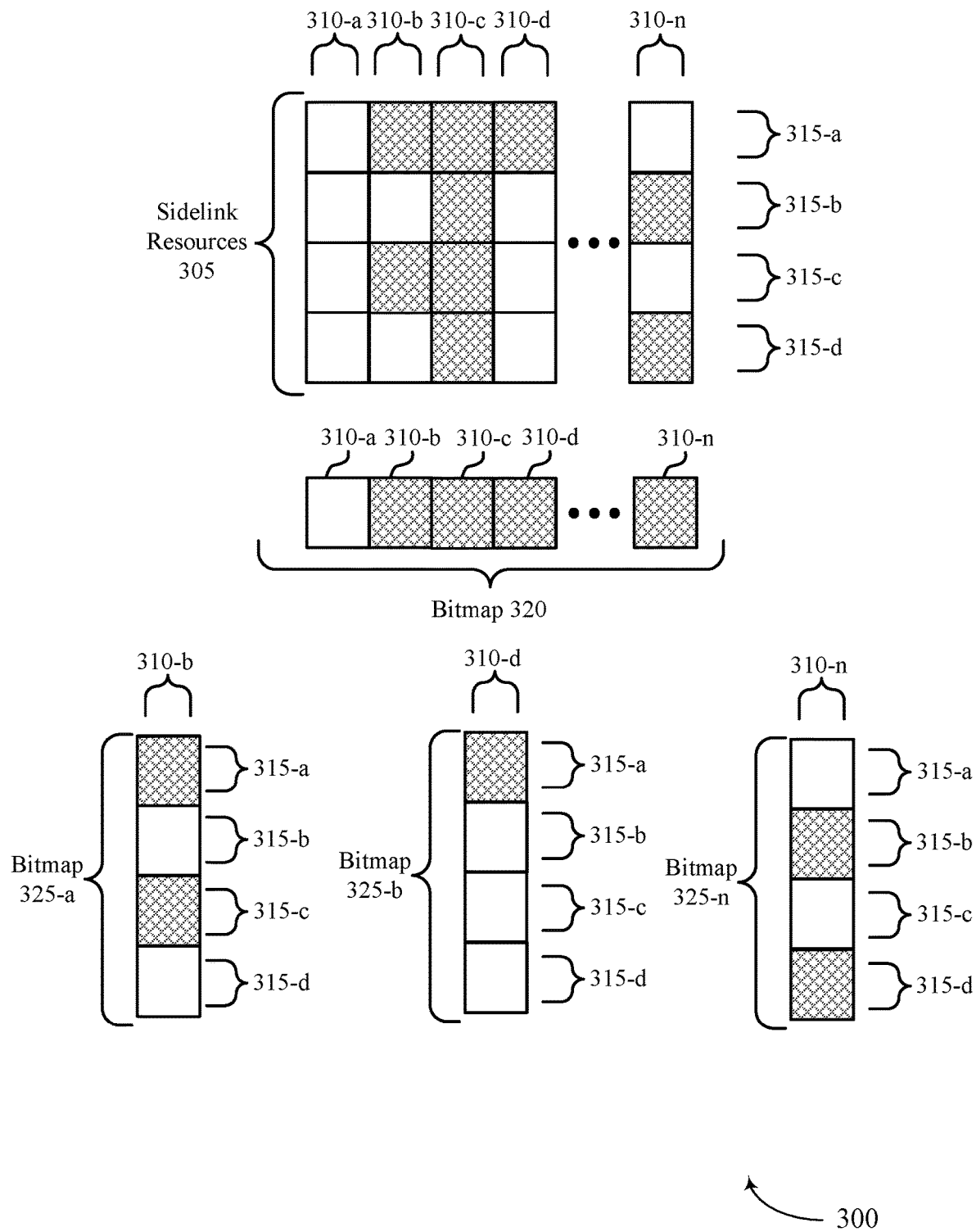
FIG. 3 illustrates an example of a resource diagram that supports signaling of a set of resources to support inter UE coordination in accordance with aspects of the present disclosure.

FIG. 3 illustrates an example of a resource diagram 300 that supports signaling of a set of resources to support inter UE coordination in accordance with aspects of the present disclosure. The resource diagram 300 may be implemented by aspects of the wireless communications system 100 and 200. For example, the resource diagram 300 may be implemented by one or more UEs 115 to support sidelink resource preference indications.

A UE 115 may monitor a set of sidelink resources 305 including a set of slots 310 and a set of associated subchannels 315. For example, the UE 115 may determine that all of the subchannels 315 associated with slot 310-a are available, subchannels 315-a and 315-c are unavailable for slot 310-b, none of the subchannels 315 are available for slot 310-c, subchannel 315-a is unavailable for slot 310-a, and subchannels 315-b and 315-d are unavailable for slot 310-n.

The UE 115 may generate a one dimensional bitmap 320 indicating which slots (e.g., slots 310-b, 310-c, 310-d, and 310-n) have subchannels that are unavailable. The UE 115 may also generate one dimensional bitmaps 325-a, 325-b, and 325-n indicating the subchannels that are unavailable and/or available for the slots 310-b, 310-d, and 310-n that have subchannels that are unavailable. Bitmap 325-a may indicate that subchannels 315-a and 315-c are unavailable for slot 310-b. Bitmap 325-b may indicate that subchannel 315-a is unavailable for slot 310-d. Bitmap 325-n may indicate that subchannels 315-b and 315-d are unavailable for slot 310-n. The UE 115 may transmit the bitmaps 320 and 325 to a second UE 115 in a sidelink coordination message. Accordingly, the second UE may avoid using the resources indicated as unavailable when scheduling sidelink communications with the UE 115 that transmitted the bitmaps or with other UEs 115. In some examples, the UE 115 may not generate a bitmap for the slot 310-c where all of the subchannels for slot 310-c are unavailable, which may indicate to a UE receiving the bitmaps that all of the subchannels for slot 310-c are unavailable.

Figure 4:
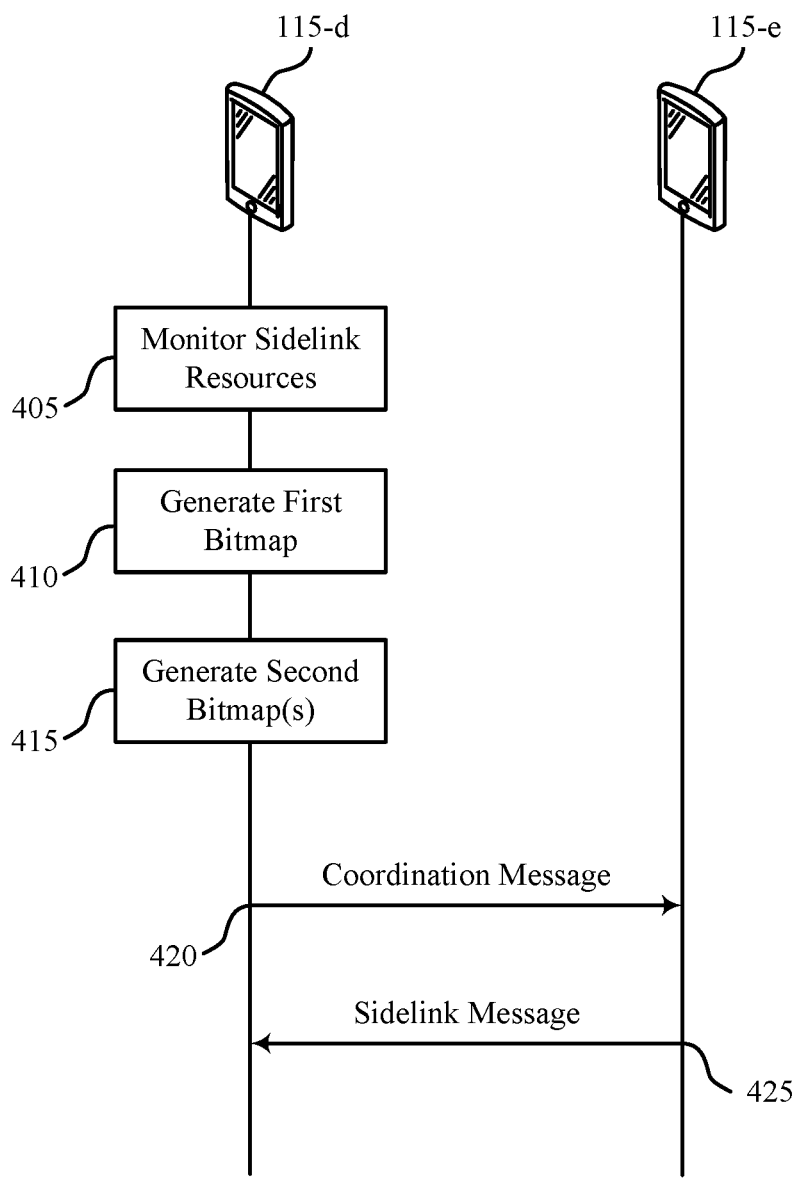
FIG. 4 illustrates an example of a process flow that supports signaling of a set of resources to support inter UE coordination in accordance with aspects of the present disclosure.

FIG. 4 illustrates an example of a process flow 400 that supports signaling of a set of resources to support inter UE coordination in accordance with aspects of the present disclosure. The process flow 400 may include a UE 115-d and a UE 115-e, which may be examples of a UE 115 as described herein. In the following description of the process flow 400, the operations between the UE 115-d and the UE 115-e may be transmitted in a different order than the example order shown, or the operations performed by the UE 115-d and the UE 115-e may be performed in different orders or at different times. Some operations may also be omitted from the process flow 400, and other operations may be added to the process flow 400.

At 405, the UE 115-d may monitor a set of sidelink resources including a set of slots and respective subchannels associated with each slot of the set of slots. In some examples, the UE 115-d may receive control signaling indicating a threshold RSRP. In some examples, the UE 115-d may receive the control signaling from the UE 115-e via an SCI message. In some examples, the threshold RSRP may be pre-configured (e.g., stored in memory of the UE 115-d). In some examples, the monitoring may include measuring an RSRP associated with each respective subchannel associated with each slot of the set of slots, where an availability of each respective subchannel associated with each slot of the set of slots is based on comparing the measured RSRP associated with each respective subchannel associated with each slot of the set of slots to the threshold RSRP.

At 410, the UE 115-d may generate, based on the monitoring at 405, an indication of a subset of slots of the set of slots. In some examples, the indication may be a first bitmap indicating the subset of slots. In some examples, the indication may be a set of slot indices. In some examples, the UE 115-*d* may select to use a bitmap or the set of slot indices based on whether the bitmap or set of slot indices is smaller in size. In some examples, the UE 115-*d* may generate the indication based on the availability of each respective subchannel associated with each slot of the set of slots. In some examples, the UE 115-*d* may select the subset of slots based on each slot of the subset of slots being associated with at least one subchannel that is unavailable for sidelink communications for the UE 115-*e*. In some examples, the UE 115-*d* may select the subset of slots based on each slot of the subset of slots being associated with at least one subchannel that is available for sidelink communications for the UE 115-*e*.

At 415, the UE 115-*d* may generate a set of bitmaps, each bitmap of the set of bitmaps associated with a slot of the subset of slots and indicating an availability of at least one subchannel associated with the respective slot. In some examples, where the UE 115-*d* may select the subset of slots based on each slot of the subset of slots being associated with at least one subchannel that is unavailable for sidelink communications for the UE 115-*e*, each bitmap of the set of bitmaps may indicate a respective set of subchannels for the respective slot that are unavailable for sidelink communications for the UE 115-*e*. In some examples, where the UE 115-*d* may select the subset of slots based on each slot of the subset of slots being associated with at least one subchannel that is unavailable for sidelink communications for the UE 115-*e*, each bitmap of the set of bitmaps may indicate a respective set of subchannels for the respective slot that are available for sidelink communications for the UE 115-*e*. In some examples, where the UE 115-*d* may select the subset of slots based on each slot of the subset of slots being associated with at least one subchannel that is available for sidelink communications for the UE 115-*e*, each bitmap of the set of bitmaps may indicate an availability or an unavailability of a respective set of subchannels for the respective slot for sidelink communications for the UE 115-*e*. In some examples, each bitmap of the set of bitmaps indicates an availability of a set of single slot resources associated with the respective slot (e.g., a single slot resource may be a set of consecutive subchannels for a slot that may be used for transmission).

At 420, the UE 115-*d* may transmit, to the UE 115-*e*, a sidelink coordination message including the indication and the set of bitmaps. In some examples, the UE 115-*d* may transmit the sidelink coordination message in an SCI message (e.g., a sidelink control stage 1 message or a sidelink control stage 2 message), a MAC control element (MAC-CE), or an RRC message.

At 425, the UE 115-*e* may transmit, to the UE 115-*d* or to a third UE 115, one or more sidelink messages using one or more of the set of sidelink resources based on the sidelink coordination message.

Figure 5:
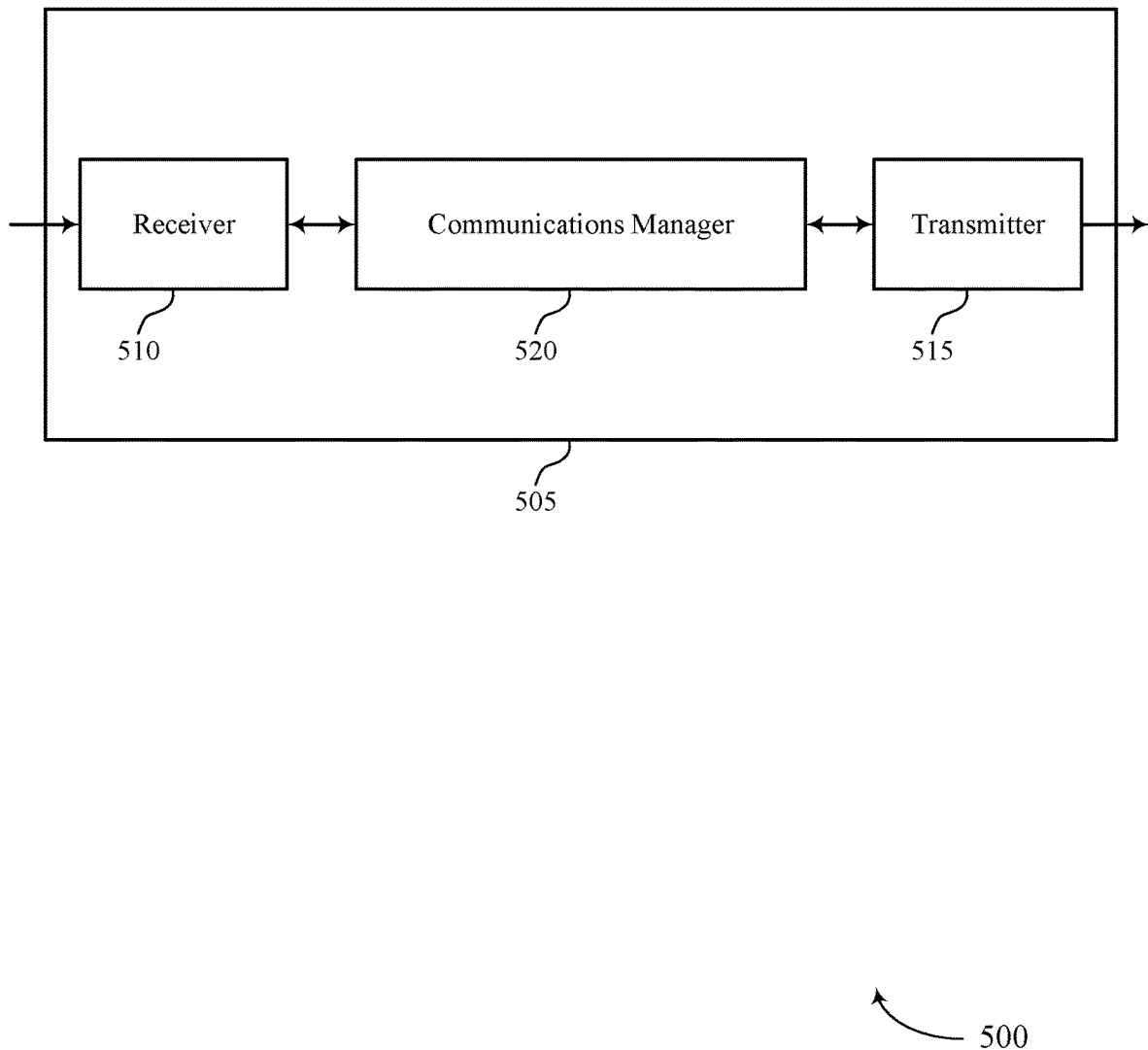
FIGS. 5 and 6 show block diagrams of devices that support signaling of a set of resources to support inter UE coordination in accordance with aspects of the present disclosure.

FIG. 5 shows a block diagram 500 of a device 505 that supports signaling of a set of resources to support inter UE coordination in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling of a set of resources to support inter UE coordination). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling of a set of resources to support inter UE coordination). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of signaling of a set of resources to support inter UE coordination as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for monitoring a set of sidelink resources including a set of slots and respective subchannels associated with each slot of the set of slots. The communications manager 520 may be configured as or otherwise support a means for generating, based on the monitoring, an indication of a subset of slots of the set of slots. The communications manager 520 may be configured as or otherwise support a means for generating, a set of bitmaps, each bitmap of the set of bitmaps associated with a slot of the subset of slots and indicating an availability of at least one subchannel associated with the respective slot. The communications manager 520 may be configured as or otherwise support a means for transmitting, to a second UE, a sidelink coordination message including the indication and the set of bitmaps.

Additionally, or alternatively, the communications manager 520 may support wireless communications at a second UE in accordance with examples as disclosed herein. For example, the communications manager 520 may be configured as or otherwise support a means for receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot. The communications manager 520 may be configured as or otherwise support a means for transmitting, to the first UE or one or more third UEs, one or more sidelink messages using one or more of the set of sidelink resources based on the sidelink coordination message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources by indicating UE preferences for sidelink resources with reduced overhead to increase sidelink reliability and reduce retransmissions of sidelink communications.

Figure 6:
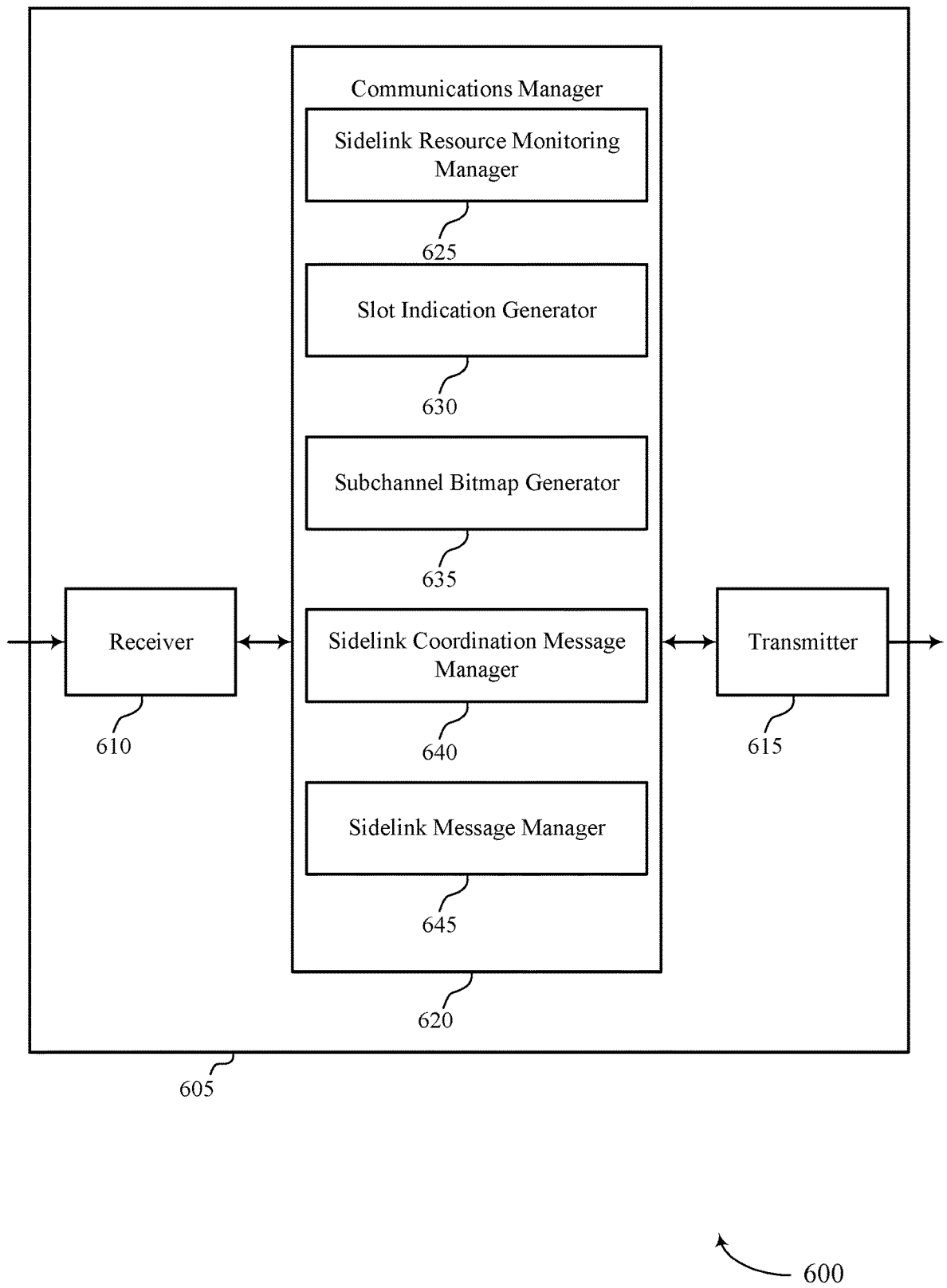

FIG. 6 shows a block diagram 600 of a device 605 that supports signaling of a set of resources to support inter UE coordination in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling of a set of resources to support inter UE coordination). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling of a set of resources to support inter UE coordination). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of signaling of a set of resources to support inter UE coordination as described herein. For example, the communications manager 620 may include a sidelink resource monitoring manager 625, a slot indication generator 630, a subchannel bitmap generator 635, a sidelink coordination message manager 640, a sidelink message manager 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The sidelink resource monitoring manager 625 may be configured as or otherwise support a means for monitoring a set of sidelink resources including a set of slots and respective subchannels associated with each slot of the set of slots. The slot indication generator 630 may be configured as or otherwise support a means for generating, based on the monitoring, an indication of a subset of slots of the set of slots. The subchannel bitmap generator 635 may be configured as or otherwise support a means for generating, a set of bitmaps, each bitmap of the set of bitmaps associated with a slot of the subset of slots and indicating an availability of at least one subchannel associated with the respective slot. The sidelink coordination message manager 640 may be configured as or otherwise support a means for transmitting, to a second UE, a sidelink coordination message including the indication and the set of bitmaps.

Additionally, or alternatively, the communications manager 620 may support wireless communications at a second UE in accordance with examples as disclosed herein. The sidelink coordination message manager 640 may be configured as or otherwise support a means for receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot. The sidelink message manager 645 may be configured as or otherwise support a means for transmitting, to the first UE or one or more third UEs, one or more sidelink messages using one or more of the set of sidelink resources based on the sidelink coordination message.

Figure 7:
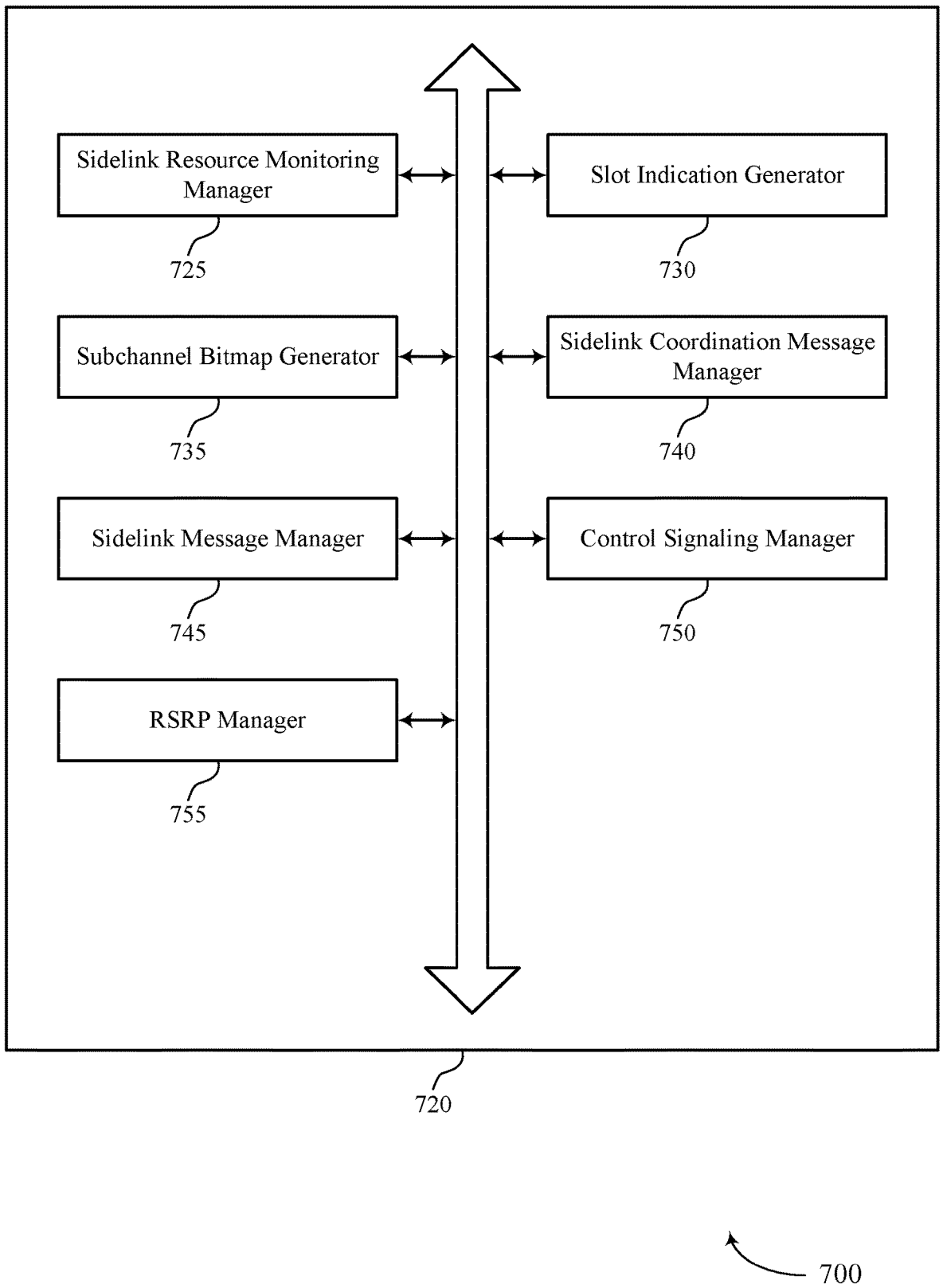
FIG. 7 shows a block diagram of a communications manager that supports signaling of a set of resources to support inter UE coordination in accordance with aspects of the present disclosure.

FIG. 7 shows a block diagram 700 of a communications manager 720 that supports signaling of a set of resources to support inter UE coordination in accordance with aspects of the present disclosure. The communications manager 720 may be an example of aspects of a communications manager 520, a communications manager 620, or both, as described herein. The communications manager 720, or various components thereof, may be an example of means for performing various aspects of signaling of a set of resources to support inter UE coordination as described herein. For example, the communications manager 720 may include a sidelink resource monitoring manager 725, a slot indication generator 730, a subchannel bitmap generator 735, a sidelink coordination message manager 740, a sidelink message manager 745, a control signaling manager 750, an RSRP manager 755, or any combination thereof. Each of these components may communicate, directly or indirectly, with one another (e.g., via one or more buses).

The communications manager 720 may support wireless communications at a first UE in accordance with examples as disclosed herein. The sidelink resource monitoring manager 725 may be configured as or otherwise support a means for monitoring a set of sidelink resources including a set of slots and respective subchannels associated with each slot of the set of slots. The slot indication generator 730 may be configured as or otherwise support a means for generating, based on the monitoring, an indication of a subset of slots of the set of slots. The subchannel bitmap generator 735 may be configured as or otherwise support a means for generating, a set of bitmaps, each bitmap of the set of bitmaps associated with a slot of the subset of slots and indicating an availability of at least one subchannel associated with the respective slot. The sidelink coordination message manager 740 may be configured as or otherwise support a means for transmitting, to a second UE, a sidelink coordination message including the indication and the set of bitmaps.

In some examples, the control signaling manager 750 may be configured as or otherwise support a means for receiving control signaling indicating a threshold reference signal received power. In some examples, the RSRP manager 755 may be configured as or otherwise support a means for measuring a reference signal received power associated with each respective subchannel associated with each slot of the set of slots, where the availability of each respective subchannel associated with each slot of the set of slots is based on comparing the measured reference signal received power associated with each respective subchannel associated with each slot of the set of slots to the threshold reference signal received power.

In some examples, the sidelink resource monitoring manager 725 may be configured as or otherwise support a means for generating the indication and the set of bitmaps based on the availability of each respective subchannel associated with each slot of the set of slots.

In some examples, to support receiving the control signaling, the control signaling manager 750 may be configured as or otherwise support a means for receiving the control signaling from the second UE via a sidelink control information message.

In some examples, to support generating the indication, the slot indication generator 730 may be configured as or otherwise support a means for generating one of a bitmap indicating the subset of slots or a set of slot indices indicating the subset of slots.

In some examples, to support generating the indication, the slot indication generator 730 may be configured as or otherwise support a means for selecting the subset of slots based on each slot of the subset of slots being associated with at least one subchannel that is unavailable for sidelink communications for the second UE.

In some examples, each bitmap of the set of bitmaps indicates an availability or an unavailability of a respective set of subchannels for the respective slot for sidelink communications for the second UE.

In some examples, each bitmap of the set of bitmaps indicates an availability of a set of single slot resources associated with the respective slot.

In some examples, each bitmap of the set of bitmaps indicates an unavailability of a set of single slot resources associated with the respective slot.

In some examples, to support generating the indication, the slot indication generator 730 may be configured as or otherwise support a means for selecting the subset of slots based on each slot of the subset of slots being associated with at least one subchannel that is available for sidelink communications for the second UE.

In some examples, each bitmap of the set of bitmaps indicates an availability or an unavailability of a respective set of subchannels for the respective slot for sidelink communications for the second UE.

In some examples, the sidelink message manager 745 may be configured as or otherwise support a means for receiving a sidelink message via one of the set of sidelink resources based on the sidelink coordination message.

In some examples, the sidelink coordination message manager 740 may be configured as or otherwise support a means for transmitting the sidelink coordination message in a sidelink control stage 1 message, a sidelink control stage 2 message, a MAC-CE, or an RRC message.

Additionally, or alternatively, the communications manager 720 may support wireless communications at a second UE in accordance with examples as disclosed herein. In some examples, the sidelink coordination message manager 740 may be configured as or otherwise support a means for receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot. The sidelink message manager 745 may be configured as or otherwise support a means for transmitting, to the first UE or one or more third UEs, one or more sidelink messages using one or more of the set of sidelink resources based on the sidelink coordination message.

In some examples, the control signaling manager 750 may be configured as or otherwise support a means for transmitting, to the first UE, control signaling indicating a threshold reference signal received power, where the availability of the at least one subchannel associated with the respective slots is based on the threshold reference signal received power.

In some examples, to support transmitting the control signaling, the control signaling manager 750 may be configured as or otherwise support a means for transmitting the control signaling via a sidelink control information message.

In some examples, each bitmap of the set of bitmaps indicates an availability or an unavailability of a respective set of subchannels for the respective slot for sidelink communications for the second UE.

In some examples, each bitmap of the set of bitmaps indicates an availability or an unavailability of a respective set of subchannels for the respective slot for sidelink communications for the second UE.

In some examples, the sidelink coordination message manager 740 may be configured as or otherwise support a means for receiving the sidelink coordination message in a sidelink control information message.

Figure 8:
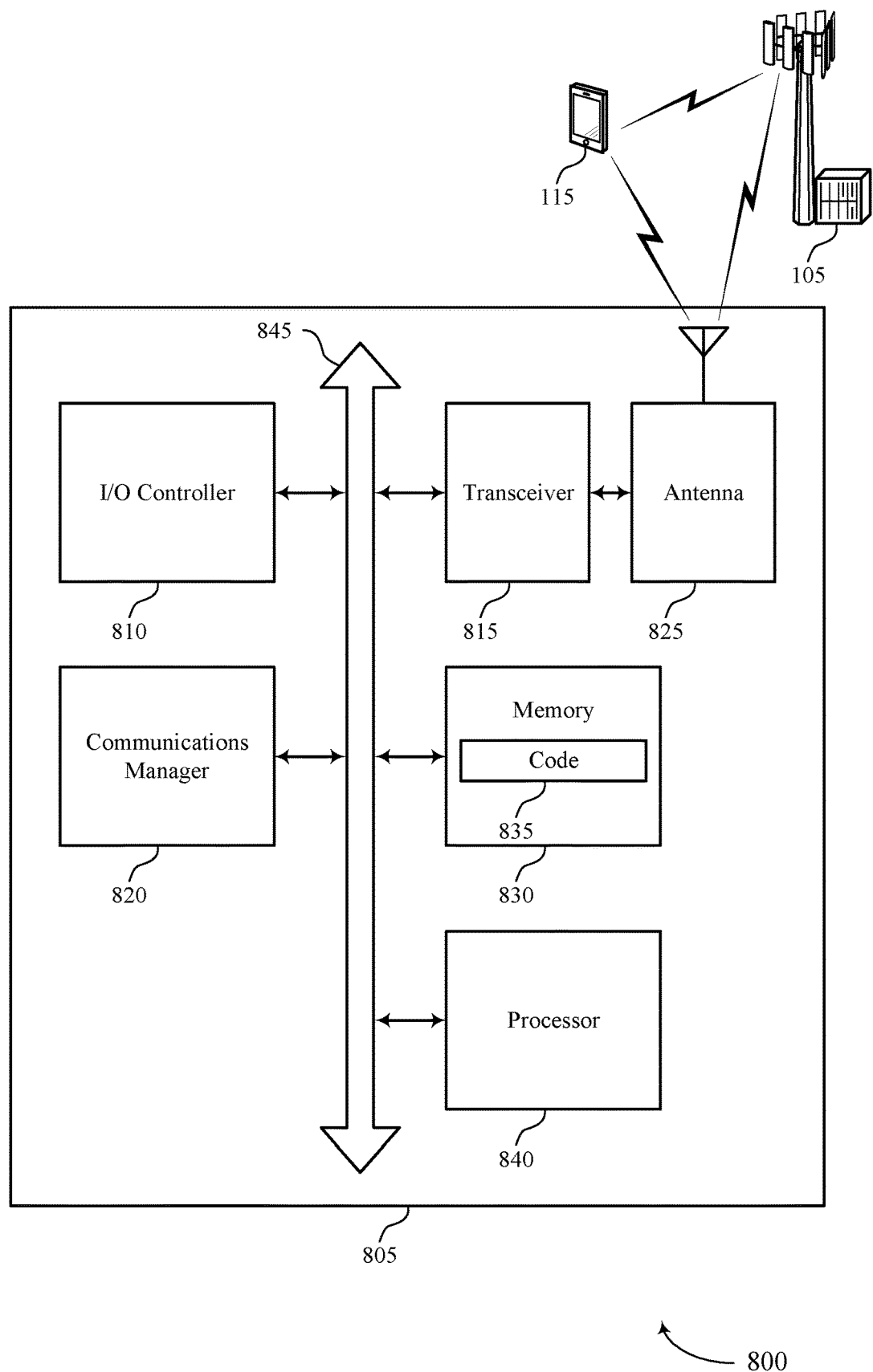
FIG. 8 shows a diagram of a system including a device that supports signaling of a set of resources to support inter UE coordination in accordance with aspects of the present disclosure.

FIG. 8 shows a diagram of a system 800 including a device 805 that supports signaling of a set of resources to support inter UE coordination in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling of a set of resources to support inter UE coordination). For example, the device 805 or a component of the device 805 may include a processor 840 and memory 830 coupled with or to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for monitoring a set of sidelink resources including a set of slots and respective subchannels associated with each slot of the set of slots. The communications manager 820 may be configured as or otherwise support a means for generating, based on the monitoring, an indication of a subset of slots of the set of slots. The communications manager 820 may be configured as or otherwise support a means for generating, a set of bitmaps, each bitmap of the set of bitmaps associated with a slot of the subset of slots and indicating an availability of at least one subchannel associated with the respective slot. The communications manager 820 may be configured as or otherwise support a means for transmitting, to a second UE, a sidelink coordination message including the indication and the set of bitmaps.

Additionally, or alternatively, the communications manager 820 may support wireless communications at a second UE in accordance with examples as disclosed herein. For example, the communications manager 820 may be configured as or otherwise support a means for receiving, from a first UE, a sidelink coordination message including: an indication of indicating a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot. The communications manager 820 may be configured as or otherwise support a means for transmitting, to the first UE or one or more third UEs, one or more sidelink messages using one or more of the set of sidelink resources based on the sidelink coordination message.

By including or configuring the communications manager 820 in accordance with examples as described herein, the device 805 may support techniques for reduced processing, reduced power consumption, improved coordination between devices, and more efficient utilization of communication resources by indicating UE preferences for sidelink resources with reduced overhead to increase sidelink reliability and reduce retransmissions of sidelink communications In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of signaling of a set of resources to support inter UE coordination as described herein, or the processor 840 and the memory 830 may be otherwise configured to perform or support such operations.

Figure 9:
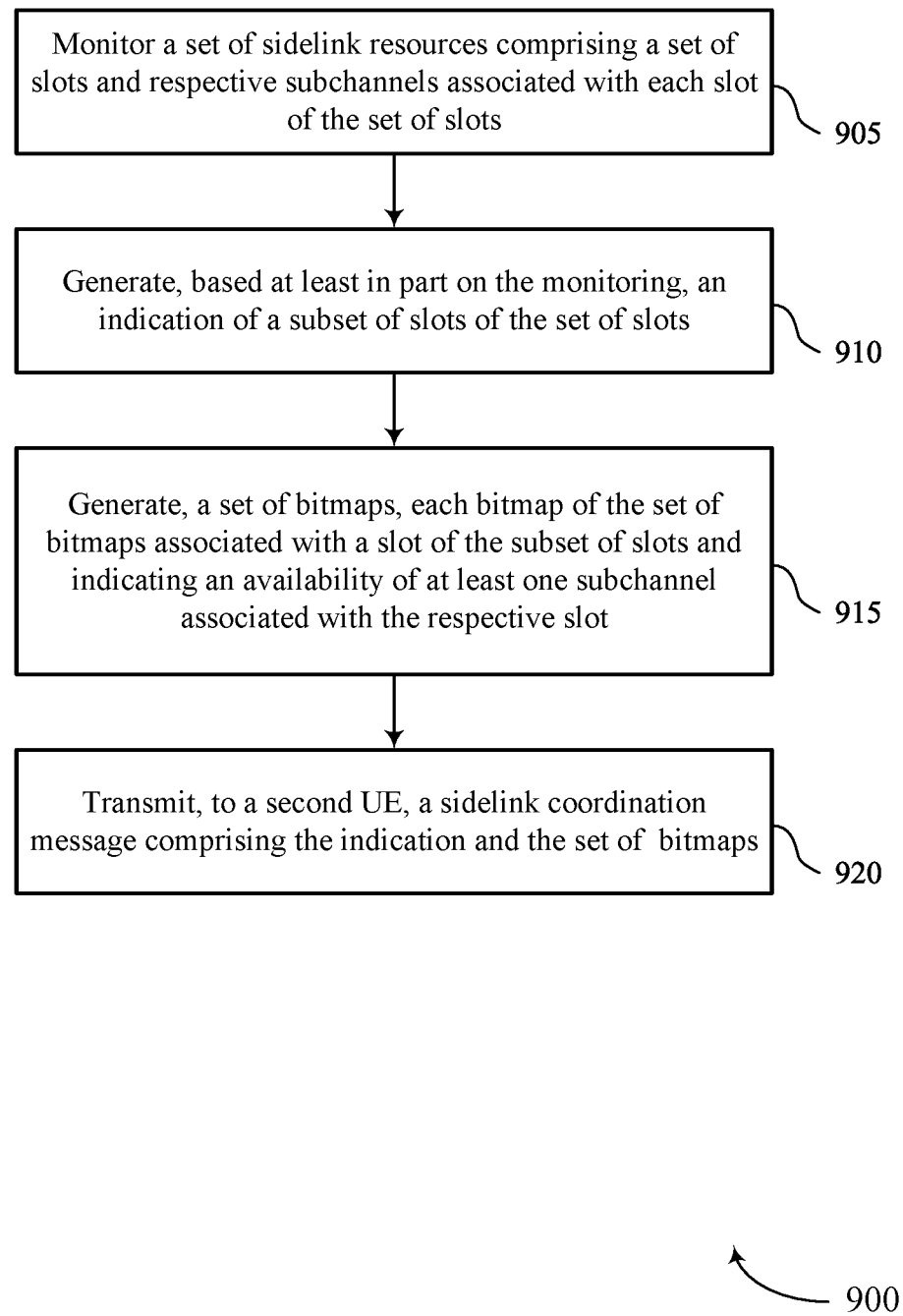
FIGS. 9 through 12 show flowcharts illustrating methods that support signaling of a set of resources to support inter UE coordination in accordance with aspects of the present disclosure.

FIG. 9 shows a flowchart illustrating a method 900 that supports signaling of a set of resources to support inter UE coordination in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include monitoring a set of sidelink resources including a set of slots and respective subchannels associated with each slot of the set of slots. The operations of 905 may be performed in accordance with examples as disclosed herein. In some examples, aspects of the operations of 905 may be performed by a sidelink resource monitoring manager 725 as described with reference to FIG. 7.

At 910, the method may include generating, based on the monitoring, an indication of a subset of slots of the set of slots. The operations of 910 may be performed in accordance with examples as disclosed herein. In some examples, aspects of the operations of 910 may be performed by a slot indication generator 730 as described with reference to FIG. 7.

At 915, the method may include generating, a set of bitmaps, each bitmap of the set of bitmaps associated with a slot of the subset of slots and indicating an availability of at least one subchannel associated with the respective slot. The operations of 915 may be performed in accordance with examples as disclosed herein. In some examples, aspects of the operations of 915 may be performed by a subchannel bitmap generator 735 as described with reference to FIG. 7.

At 920, the method may include transmitting, to a second UE, a sidelink coordination message including the indication and the set of bitmaps. The operations of 920 may be performed in accordance with examples as disclosed herein. In some examples, aspects of the operations of 920 may be performed by a sidelink coordination message manager 740 as described with reference to FIG. 7.

Figure 10:
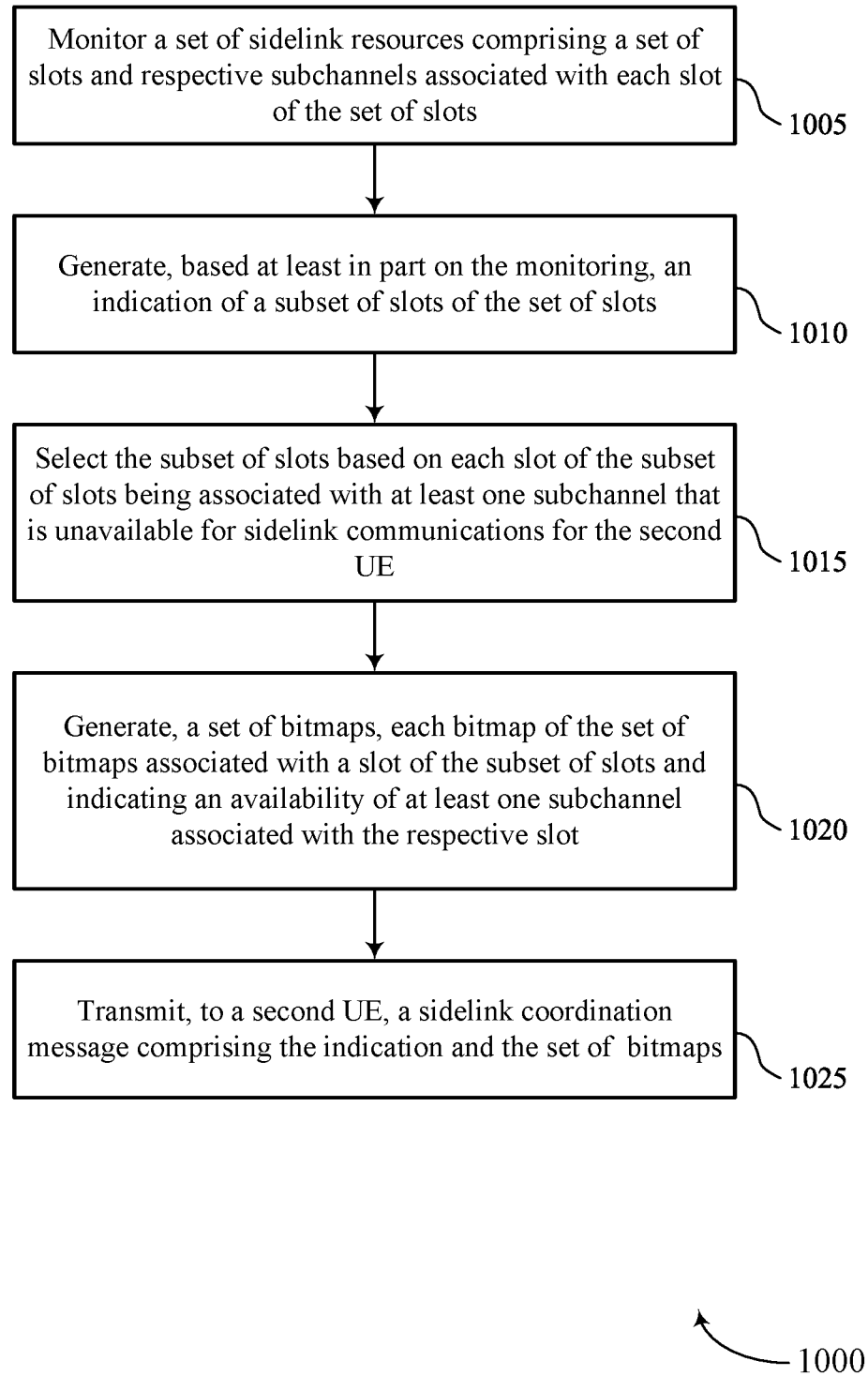

FIG. 10 shows a flowchart illustrating a method 1000 that supports signaling of a set of resources to support inter UE coordination in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include monitoring a set of sidelink resources including a set of slots and respective subchannels associated with each slot of the set of slots. The operations of 1005 may be performed in accordance with examples as disclosed herein. In some examples, aspects of the operations of 1005 may be performed by a sidelink resource monitoring manager 725 as described with reference to FIG. 7.

At 1010, the method may include generating, based on the monitoring, an indication of a subset of slots of the set of slots. The operations of 1010 may be performed in accordance with examples as disclosed herein. In some examples, aspects of the operations of 1010 may be performed by a slot indication generator 730 as described with reference to FIG. 7.

At 1015, the method may include selecting the subset of slots based on each slot of the subset of slots being associated with at least one subchannel that is unavailable for sidelink communications for the second UE. The operations of 1015 may be performed in accordance with examples as disclosed herein. In some examples, aspects of the operations of 1015 may be performed by a slot indication generator 730 as described with reference to FIG. 7.

At 1020, the method may include generating, a set of bitmaps, each bitmap of the set of bitmaps associated with a slot of the subset of slots and indicating an availability of at least one subchannel associated with the respective slot. The operations of 1020 may be performed in accordance with examples as disclosed herein. In some examples, aspects of the operations of 1020 may be performed by a subchannel bitmap generator 735 as described with reference to FIG. 7.

At 1025, the method may include transmitting, to a second UE, a sidelink coordination message including the indication and the set of bitmaps. The operations of 1025 may be performed in accordance with examples as disclosed herein. In some examples, aspects of the operations of 1025 may be performed by a sidelink coordination message manager 740 as described with reference to FIG. 7.

Figure 11:
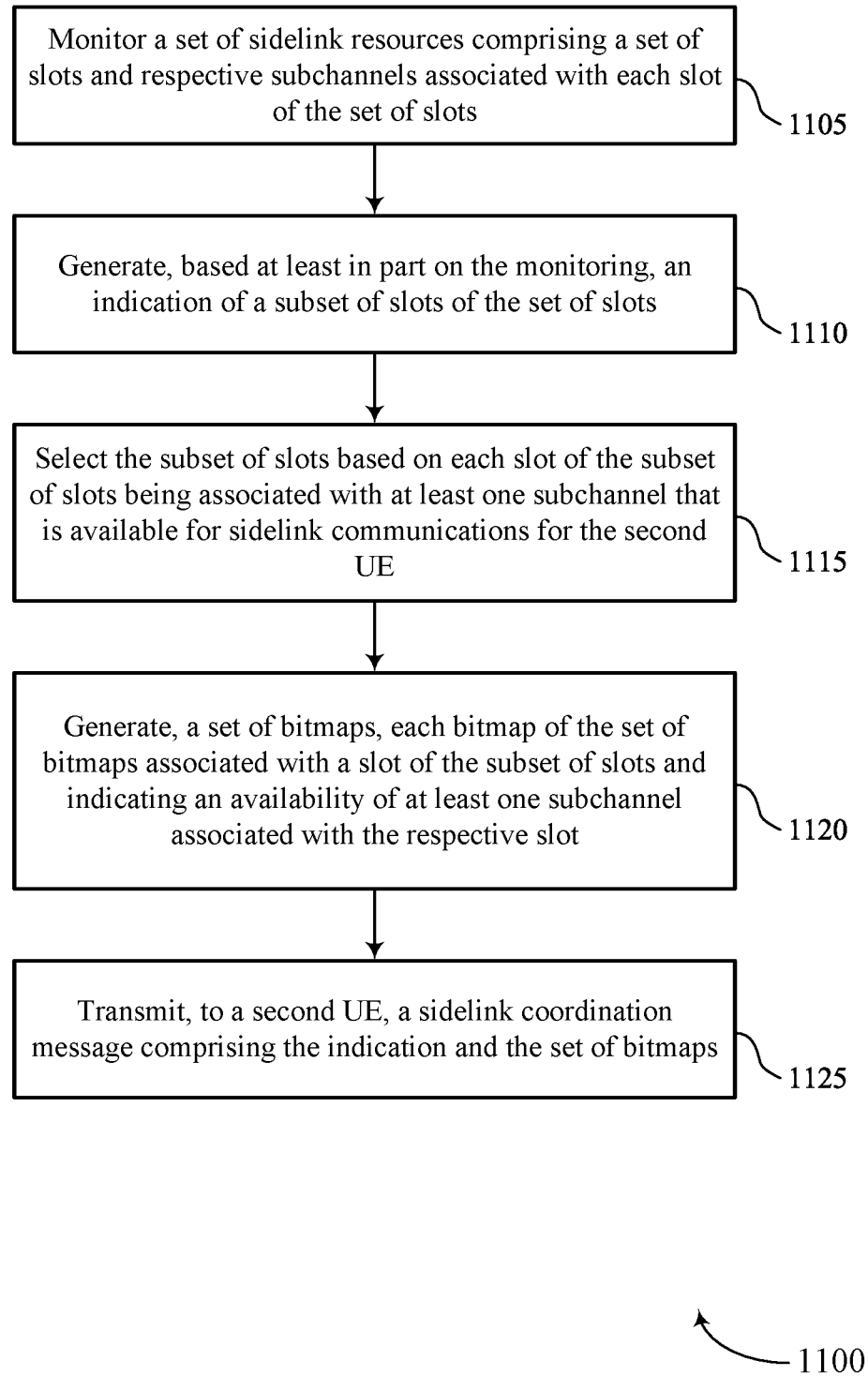

FIG. 11 shows a flowchart illustrating a method 1100 that supports signaling of a set of resources to support inter UE coordination in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include monitoring a set of sidelink resources including a set of slots and respective subchannels associated with each slot of the set of slots. The operations of 1105 may be performed in accordance with examples as disclosed herein. In some examples, aspects of the operations of 1105 may be performed by a sidelink resource monitoring manager 725 as described with reference to FIG. 7.

At 1110, the method may include generating, based on the monitoring, an indication of a subset of slots of the set of slots. The operations of 1110 may be performed in accordance with examples as disclosed herein. In some examples, aspects of the operations of 1110 may be performed by a slot indication generator 730 as described with reference to FIG. 7.

At 1115, the method may include selecting the subset of slots based on each slot of the subset of slots being associated with at least one subchannel that is available for sidelink communications for the second UE. The operations of 1115 may be performed in accordance with examples as disclosed herein. In some examples, aspects of the operations of 1115 may be performed by a slot indication generator 730 as described with reference to FIG. 7.

At 1120, the method may include generating, a set of bitmaps, each bitmap of the set of bitmaps associated with a slot of the subset of slots and indicating an availability of at least one subchannel associated with the respective slot. The operations of 1120 may be performed in accordance with examples as disclosed herein. In some examples, aspects of the operations of 1120 may be performed by a subchannel bitmap generator 735 as described with reference to FIG. 7.

At 1125, the method may include transmitting, to a second UE, a sidelink coordination message including the indication and the set of bitmaps. The operations of 1125 may be performed in accordance with examples as disclosed herein. In some examples, aspects of the operations of 1125 may be performed by a sidelink coordination message manager 740 as described with reference to FIG. 7.

Figure 12:
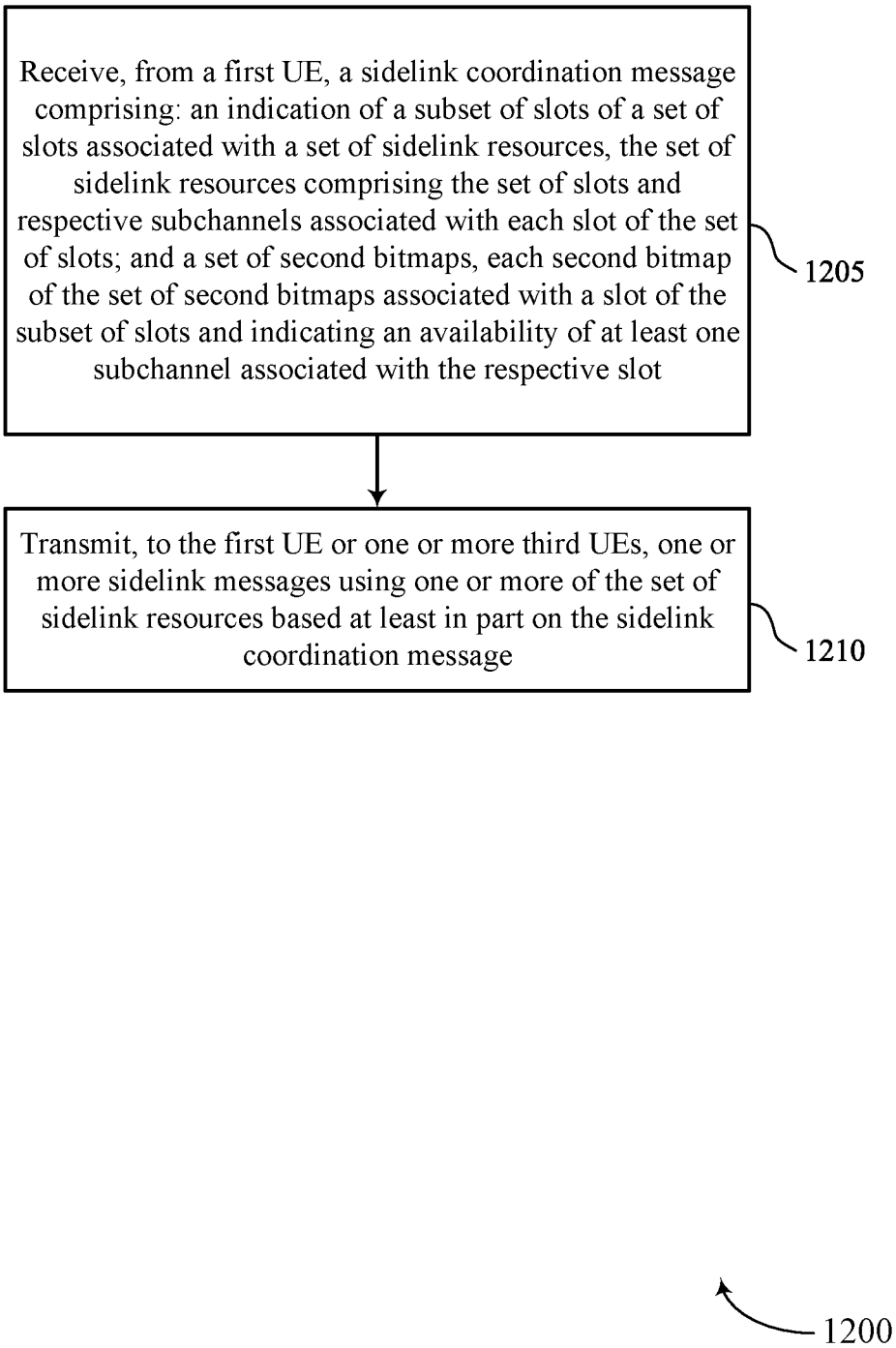

FIG. 12 shows a flowchart illustrating a method 1200 that supports signaling of a set of resources to support inter UE coordination in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving, from a first UE, a sidelink coordination message including: an indication of a subset of slots of a set of slots associated with a set of sidelink resources, the set of sidelink resources including the set of slots and respective subchannels associated with each slot of the set of slots; and a set of bitmaps, each bitmap of the set of bitmaps associated with a slot of the subset of slots and indicating an availability of at least one subchannel associated with the respective slot. The operations of 1205 may be performed in accordance with examples as disclosed herein. In some examples, aspects of the operations of 1205 may be performed by a sidelink coordination message manager 740 as described with reference to FIG. 7.

At 1210, the method may include transmitting, to the first UE or one or more third UEs, one or more sidelink messages using one or more of the set of sidelink resources based on the sidelink coordination message. The operations of 1210 may be performed in accordance with examples as disclosed herein. In some examples, aspects of the operations of 1210 may be performed by a sidelink message manager 745 as described with reference to FIG. 7.

The following provides an overview of aspects of the present disclosure:

Aspect 1: A method for wireless communications at a first UE, comprising: monitoring a set of sidelink resources comprising a set of slots and respective subchannels associated with each slot of the set of slots; generating, based at least in part on the monitoring, an indication of a subset of slots of the set of slots; generating, a set of bitmaps, each bitmap of the set of bitmaps associated with a slot of the subset of slots and indicating an availability of at least one subchannel associated with the respective slot; and transmitting, to a second UE, a sidelink coordination message comprising the indication and the set of bitmaps.

Aspect 2: The method of aspect 1, further comprising: receiving control signaling indicating a threshold reference signal received power; and measuring a reference signal received power associated with each respective subchannel associated with each slot of the set of slots, wherein the availability of each respective subchannel associated with each slot of the set of slots is based at least in part on comparing the measured reference signal received power associated with each respective subchannel associated with each slot of the set of slots to the threshold reference signal received power.

Aspect 3: The method of aspect 2, further comprising: generating the indication and the set of bitmaps based at least in part on the availability of each respective subchannel associated with each slot of the set of slots.

Aspect 4: The method of any of aspects 2 through 3, wherein receiving the control signaling comprises: receiving the control signaling from the second UE via a sidelink control information message.

Aspect 5: The method of any of aspects 1 through 4, wherein generating the indication comprises: generating one of a bitmap indicating the subset of slots or a set of slot indices indicating the subset of slots.

Aspect 6: The method of any of aspects 1 through 5, wherein generating the indication comprises: selecting the subset of slots based at least in part on each slot of the subset of slots being associated with at least one subchannel that is unavailable for sidelink communications for the second UE.

Aspect 7: The method of aspect 6, wherein each bitmap of the set of bitmaps indicates an availability or an unavailability of a respective set of subchannels for the respective slot for sidelink communications for the second UE.

Aspect 8: The method of any of aspects 1 through 7, wherein generating the indication comprises: selecting the subset of slots based at least in part on each slot of the subset of slots being associated with at least one subchannel that is available for sidelink communications for the second UE.

Aspect 9: The method of aspect 8, wherein each bitmap of the set of bitmaps indicates an availability or an unavailability of a respective set of subchannels for the respective slot for sidelink communications for the second UE.

Aspect 10: The method of any of aspects 1 through 9, wherein each bitmap of the set of bitmaps indicates an availability of a set of single slot resources associated with the respective slot.

Aspect 11: The method of any of aspects 1 through 10, further comprising: receiving a sidelink message via one of the set of sidelink resources based at least in part on the sidelink coordination message.

Aspect 12: The method of any of aspects 1 through 11, further comprising: transmitting the sidelink coordination message in one of a sidelink control stage 1 message, a sidelink control stage 2 message, a MAC control element, or a radio resource control message.

Aspect 13: A method for wireless communications at a second UE, comprising: receiving, from a first UE, a sidelink coordination message comprising: an indication of a subset of slots of a set of slots associated with a set of sidelink resources, the set of sidelink resources comprising the set of slots and respective subchannels associated with each slot of the set of slots; and a set of bitmaps, each bitmap of the set of bitmaps associated with a slot of the subset of slots and indicating an availability of at least one subchannel associated with the respective slot; and transmitting, to the first UE or one or more third UEs, one or more sidelink messages using one or more of the set of sidelink resources based at least in part on the sidelink coordination message.

Aspect 14: The method of aspect 13, further comprising: transmitting, to the first UE, control signaling indicating a threshold reference signal received power, wherein the availability of the at least one subchannel associated with the respective slots is based at least in part on the threshold reference signal received power.

Aspect 15: The method of aspect 14, wherein transmitting the control signaling comprises: transmitting the control signaling via a sidelink control information message.

Aspect 16: The method of any of aspects 13 through 15, wherein the indication comprises one of a bitmap indicating the subset of slots or a set of slot indices indicating the subset of slots.

Aspect 17: The method of any of aspects 13 through 16, wherein each bitmap of the set of bitmaps indicates an availability or an unavailability of a respective set of subchannels for the respective slot for sidelink communications for the second UE.

Aspect 18: The method of any of aspects 13 through 17, wherein each bitmap of the set of bitmaps indicates an availability of a set of single slot resources associated with the respective slot.

Aspect 19: The method of any of aspects 13 through 18, further comprising: receiving the sidelink coordination message in one of a sidelink control stage 1 message, a sidelink control stage 2 message, a MAC control element, or a radio resource control message.

Aspect 20: An apparatus for wireless communications at a first UE, comprising a processor; memory coupled with the processor; and instructions stored in the memory and executable by the processor to cause the apparatus to perform a method of any of aspects 1 through 12.

Aspect 21: An apparatus for wireless communications at a first UE, comprising at least one means for performing a method of any of aspects 1 through 12.

Aspect 22: A non-transitory computer-readable medium storing code for wireless communications at a first UE, the code comprising instructions executable by a processor to perform a method of any of aspects 1 through 12.

Aspect 23: An apparatus for wireless communications at a second UE, comprising a processor; memory coupled with the processor; and instructions stored in the memory and executable by the processor to cause the apparatus to perform a method of any of aspects 13 through 19.

Aspect 24: An apparatus for wireless communications at a second UE, comprising at least one means for performing a method of any of aspects 13 through 19.

Aspect 25: A non-transitory computer-readable medium storing code for wireless communications at a second UE, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    monitoring a set of sidelink resources comprising a set of slots and respective subchannels associated with each slot of the set of slots;
    generating, based at least in part on the monitoring, an indication of a subset of slots of the set of slots, the subset of slots selected from the set of slots based at least in part on an availability of one or more subchannels within the subset of slots, the subset of slots comprising two or more slots, and the subset of slots comprising less than all slots of the set of slots, wherein the indication comprises a first bitmap indicating the subset of slots or a set of slot indices indicating the subset of slots;
    generating, based at least in part on the monitoring, a set of bitmaps, the set of bitmaps comprising a bitmap per each slot of the subset of slots, and a respective bitmap of the set of bitmaps indicating an availability of at least one subchannel within a respective slot of the subset of slots associated with the respective bitmap of the set of bitmaps; and
    transmitting, to a second UE, a sidelink coordination message comprising the set of bitmaps and one of the first bitmap or the set of slot indices.

2. The method of claim 1, further comprising:
    receiving control signaling indicating a threshold reference signal received power; and
    measuring a reference signal received power associated with each respective subchannel associated with each slot of the set of slots, wherein the availability of each respective subchannel associated with each slot of the set of slots is based at least in part on comparing the measured reference signal received power associated with each respective subchannel associated with each slot of the set of slots to the threshold reference signal received power.

3. The method of claim 2, further comprising:
    generating the indication and the set of bitmaps based at least in part on the availability of each respective subchannel associated with each slot of the set of slots.

4. The method of claim 2, wherein receiving the control signaling comprises:
    receiving the control signaling from the second UE via a sidelink control information message.

5. The method of claim 1, wherein generating the indication comprises:
    selecting the subset of slots based at least in part on each slot of the subset of slots being associated with at least one subchannel that is unavailable for sidelink communications for the second UE.

6. The method of claim 5, wherein each bitmap of the set of bitmaps indicates an availability or an unavailability of a respective set of subchannels within the respective slot for sidelink communications for the second UE.

7. The method of claim 1, wherein generating the indication comprises:
    selecting the subset of slots based at least in part on each slot of the subset of slots being associated with at least one subchannel that is available for sidelink communications for the second UE.

8. The method of claim 7, wherein each bitmap of the set of bitmaps indicates an availability or an unavailability of a respective set of subchannels for the respective slot for sidelink communications for the second UE.

9. The method of claim 1, wherein each bitmap of the set of bitmaps indicates an availability of a set of single slot resources associated with the respective slot.

10. The method of claim 1, further comprising:
    receiving a sidelink message via one of the set of sidelink resources based at least in part on the sidelink coordination message.

11. The method of claim 1, further comprising:
    transmitting the sidelink coordination message in one of a sidelink control stage 1 message, a sidelink control stage 2 message, a medium access control (MAC) control element, or a radio resource control message.

12. The method of claim 1, further comprising:
measuring a reference signal received power associated with each respective subchannel associated with each slot of the set of slots, wherein the availability of each respective subchannel associated with each slot of the set of slots is based at least in part on comparing the measured reference signal received power associated with each respective subchannel associated with each slot of the set of slots to a threshold reference signal received power; and
generating the indication and the set of bitmaps based at least in part on the availability of each respective subchannel associated with each slot of the set of slots.

13. A method for wireless communications at a second user equipment (UE), comprising:
receiving, from a first UE, a sidelink coordination message comprising:
an indication of a subset of slots of a set of slots associated with a set of sidelink resources, the set of sidelink resources comprising the set of slots and respective subchannels associated with each slot of the set of slots, the subset of slots selected from the set of slots based at least in part on an availability of one or more subchannels within the subset of slots, the subset of slots comprising two or more slots, and the subset of slots comprising less than all slots of the set of slots, wherein the indication comprises a first bitmap indicating the subset of slots or a set of slot indices indicating the subset of slots; and
a set of bitmaps, the set of bitmaps comprising a bitmap per each slot of the subset of slots, and a respective bitmap of the set of bitmaps indicating an availability of at least one subchannel within a respective slot of the subset of slots associated with the respective bitmap of the set of bitmaps; and
transmitting, to the first UE or one or more third UEs, one or more sidelink messages using one or more of the set of sidelink resources based at least in part on the sidelink coordination message comprising the set of bitmaps and one of the first bitmap or the set of slot indices.

14. The method of claim 13, further comprising:
transmitting, to the first UE, control signaling indicating a threshold reference signal received power, wherein the availability of the at least one subchannel associated with the respective slot is based at least in part on the threshold reference signal received power.

15. The method of claim 14, wherein transmitting the control signaling comprises:
transmitting the control signaling via a sidelink control information message.

16. The method of claim 13, wherein each bitmap of the set of bitmaps indicates an availability or an unavailability of a respective set of subchannels within the respective slot for sidelink communications for the second UE.

17. The method of claim 13, wherein each bitmap of the set of bitmaps indicates an availability of a set of single slot resources associated with the respective slot.

18. The method of claim 13, further comprising:
receiving the sidelink coordination message in one of a sidelink control stage 1 message, a sidelink control stage 2 message, a medium access control (MAC) control element, or a radio resource control message.

19. An apparatus for wireless communications at a first user equipment (UE), comprising:
one or more processors;
memory coupled with the one or more processors; and
instructions stored in the memory and executable by the one or more processors to cause the apparatus to:
monitor a set of sidelink resources comprising a set of slots and respective subchannels associated with each slot of the set of slots;
generate, based at least in part on the monitoring, an indication of a subset of slots of the set of slots, the subset of slots selected from the set of slots based at least in part on an availability of one or more subchannels within the subset of slots, the subset of slots comprising two or more slots, and the subset of slots comprising less than all slots of the set of slots, wherein the indication comprises a first bitmap indicating the subset of slots or a set of slot indices indicating the subset of slots;
generate, based at least in part on the monitoring, a set of bitmaps, the set of bitmaps comprising a bitmap per each slot of the subset of slots, and a respective bitmap of the set of bitmaps indicating an availability of at least one subchannel within a respective slot of the subset of slots associated with the respective bitmap of the set of bitmaps; and
transmit, to a second UE, a sidelink coordination message comprising the set of bitmaps and one of the first bitmap or the set of slot indices.

20. The apparatus of claim 19, wherein the instructions are further executable by the one or more processors to cause the apparatus to:
receive control signaling indicating a threshold reference signal received power; and
measure a reference signal received power associated with each respective subchannel associated with each slot of the set of slots, wherein the availability of each respective subchannel associated with each slot of the set of slots is based at least in part on comparing the measured reference signal received power associated with each respective subchannel associated with each slot of the set of slots to the threshold reference signal received power.

21. The apparatus of claim 20, wherein the instructions are further executable by the one or more processors to cause the apparatus to:
generate the indication and the set of bitmaps based at least in part on the availability of each respective subchannel associated with each slot of the set of slots.

22. The apparatus of claim 20, wherein the instructions to receive the control signaling are executable by the one or more processors to cause the apparatus to:
receive the control signaling from the second UE via a sidelink control information message.

23. The apparatus of claim 19, wherein the instructions to generate the indication are executable by the one or more processors to cause the apparatus to:
select the subset of slots based at least in part on each slot of the subset of slots being associated with at least one subchannel that is unavailable for sidelink communications for the second UE.

24. The apparatus of claim 23, wherein each bitmap of the set of bitmaps indicates an availability or an unavailability of a respective set of subchannels within the respective slot for sidelink communications for the second UE.

25. The apparatus of claim 19, wherein the instructions to generate the indication are executable by the one or more processors to cause the apparatus to:

select the subset of slots based at least in part on each slot of the subset of slots being associated with at least one subchannel that is available for sidelink communications for the second UE.

26. The apparatus of claim 25, wherein each bitmap of the set of bitmaps indicates an availability or an unavailability of a respective set of subchannels for the respective slot for sidelink communications for the second UE.

27. An apparatus for wireless communications at a second user equipment (UE), comprising:
one or more processors;
memory coupled with the one or more processors; and
instructions stored in the memory and executable by the one or more processors to cause the apparatus to:
receive, from a first UE, a sidelink coordination message comprising:
an indication of a subset of slots of a set of slots associated with a set of sidelink resources, the set of sidelink resources comprising the set of slots and respective subchannels associated with each slot of the set of slots, the subset of slots selected from the set of slots based at least in part on an availability of one or more subchannels within the subset of slots, the subset of slots comprising two or more slots, and the subset of slots comprising less than all slots of the set of slots, wherein the indication comprises a first bitmap indicating the subset of slots or a set of slot indices indicating the subset of slots; and
a set of bitmaps, the set of bitmaps comprising a bitmap per each slot of the subset of slots, and a respective bitmap of the set of bitmaps indicating an availability of at least one subchannel within a respective slot of the subset of slots associated with the respective bitmap of the set of bitmaps; and
transmit, to the first UE or one or more third UEs, one or more sidelink messages using one or more of the set of sidelink resources based at least in part on the sidelink coordination message comprising the set of bitmaps and one of the first bitmap or the set of slot indices.

* * * * *